United States Patent [19]
Miyake et al.

[11] 4,185,300
[45] Jan. 22, 1980

[54] PHASE CONTROL OF PARABOLIC WAVE IN SPECIAL EFFECTS SYSTEM

[75] Inventors: Kazuhiko Miyake; Bunkichi Yamada, both of Kawasaki, Japan

[73] Assignee: Tokyo Shibaura Electric Co., Ltd., Kawasaki, Japan

[21] Appl. No.: 874,226

[22] Filed: Feb. 1, 1978

[30] Foreign Application Priority Data

Feb. 4, 1977 [JP] Japan .................................. 52-11484

[51] Int. Cl.² .............................................. H04N 5/22
[52] U.S. Cl. .................................................. 358/183
[58] Field of Search ........................ 358/183, 181, 22; 315/370, 371; 328/155, 158, 13, 14, 21; 307/262

[56] References Cited

U.S. PATENT DOCUMENTS 3,715,487  2/1973  Blake .................................. 358/183

FOREIGN PATENT DOCUMENTS 49-62027   6/1974  Japan ........................................ 358/183
49-120526 11/1974 Japan ........................................ 358/183

*Primary Examiner*—John C. Martin
*Attorney, Agent, or Firm*—Cushman, Darby & Cushman

[57] ABSTRACT

A system is disclosed which controls the phase or the peak position of a continuous parabolic wave to move the position of a circular or elliptic montage pattern on the screen of a television cathode ray tube. A fundamental parabolic wave whose amplitude and phase are fixed and a sawtooth wave are produced at a predetermined frequency (horizontal line- and vertical field-scanning frequency). A predetermined DC potential is inserted into the parabolic wave signal during a specific period of each cycle or a horizontal fly-back time. A DC potential proportional to a position control quantity of the montage pattern is inserted into the sawtooth wave signal during the specific period of each cycle thereof. Then, the sawtooth wave signal is controlled in its amplitude in proportion to the position control quantity and is mixed with the parabolic signal to produce a horizontal or vertical parabolic wave component. Before mixed with the parabolic wave, a potential of the sawtooth wave signal during the specific period thereof is clamped to a predetermined potential or a potential of the mixture of the parabolic wave and the sawtooth wave during the specific period of each cycle is clamped to a predetermined potential. A horizontal parabolic component and a vertical parabolic component are mixed together and then sliced to produce a keying signal for combining two video signals into a single composite video signal.

27 Claims, 17 Drawing Figures

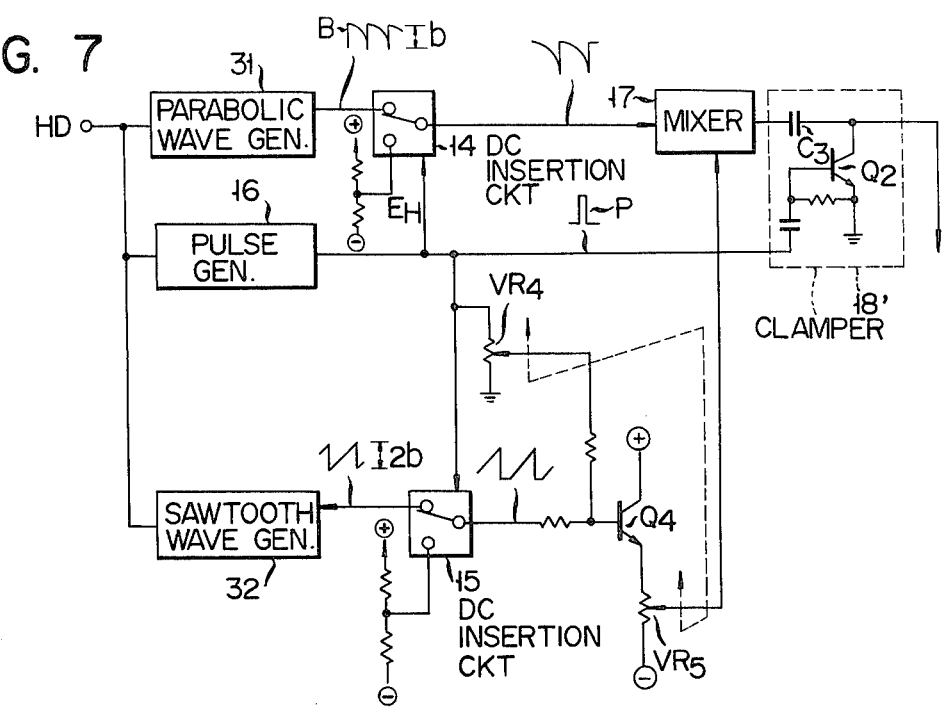
FIG. 7
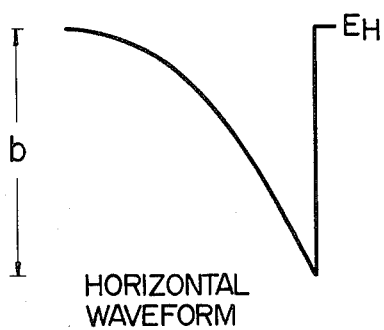
FIG. 8A HORIZONTAL WAVEFORM
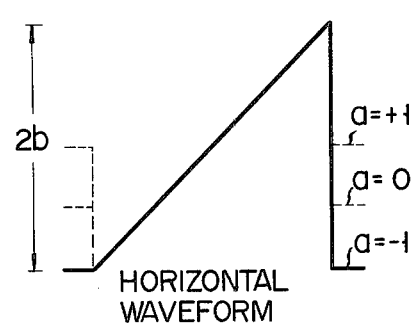
FIG. 8B HORIZONTAL WAVEFORM
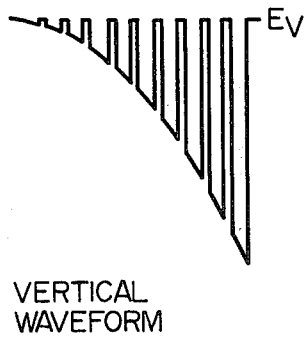
FIG. 9A VERTICAL WAVEFORM
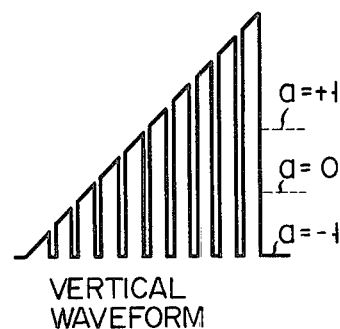
FIG. 9B VERTICAL WAVEFORM
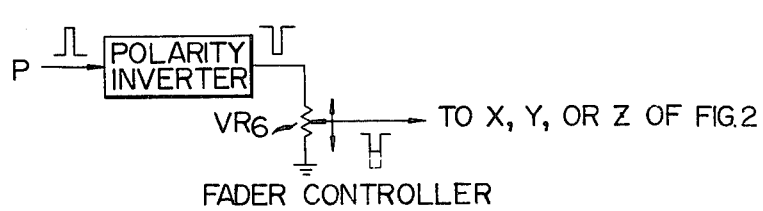
FIG. 10 FADER CONTROLLER

PHASE CONTROL OF PARABOLIC WAVE IN SPECIAL EFFECTS SYSTEM

BACKGROUND OF THE INVENTION

The present invention relates to a video special effect signal generating apparatus used in a television studio and, more particularly, to a control system for controlling the phase or peak position of a parabolic wave used for producing a circular or elliptic montage pattern on the screen of a television cathode ray tube.

As one of the known video special effects is known the wipe or montage effect in which into part of the picture screen a picture is inserted which is different from a picture on the remaining part of the screen. In order to obtain such video special effect, it is necessary to form a switching signal or a keying signal to combine two video signals into a single composite video signal. In a conventional video special effect producing apparatus for providing a circular montage pattern of a typical montage pattern, horizontal and vertical parabolic waves with the horizontal and vertical scanning frequencies are formed by using horizontal and vertical drive pulses, respectively and then these parabolic waves are mixed. The mixed signal is sliced by a slicer circuit to produce the keying signal. In case where the vertical and horizontal parabolic waves have each a symmetrical waveform a keying signal is produced for providing a circular wipe pattern centered at the center of a screen. The size of the circular wipe pattern is adjusted by changing the slice level in the slicer circuit through an operation of a fader control device. The vertical and horizontal shift or movement of the wipe pattern is carried out by adjusting the relative phase or time between the horizontal and vertical drive pulses through position control devices connected to phase adjusting circuits for the horizontal and vertical drive pulses. The phase or the peak position resulting from this operation shifts with respect to that of the parabolic wave for forming the pattern centered at the center of the screen.

As just mentioned, the wipe pattern is moved by adjusting the relative phase between the horizontal and vertical drive pulses. For this reason, when the center of the wipe pattern is far away from the screen center, it will be observed that an undesired twin pattern appears at the location of the screen opposite to that of a desired pattern, if the pattern is expanded by means of the fader control device. For prohibiting such an undesired twin pattern appearance, it is common practice to remove part of a parabolic waveform within one cycle period of the horizontal and/or vertical parabolic waves. The parabolic wave discontinuous during one cycle period thus obtained, however, forms a distorted pattern. In the case of the circular pattern, a part of the circle becomes linear depending on the position and size of the circular pattern. Further, as the pattern center is distanced from the screen center, it is more difficult to change over a picture from one to another.

These problems are similarly found in the case of an elliptic wipe pattern which is formed by changing the relative amplitude between the horizontal and vertical parabolic waves.

This necessitates horizontal and vertical parabolic waves of which instantaneous amplitudes continuously change even if the peak is positioned at any point of one cycle period.

SUMMARY OF THE INVENTION

Accordingly, an object of the present invention is to provide a system for controlling the phase or peak position of a continuous parabolic wave, without the need of the phase adjustments of horizontal and vertical drive pulses.

Another object of the invention is to provide a parabolic wave phase control system adaptable for use of an AC coupled circuitry which is easy in circuit design.

These objects may be attained by inserting a predetermined DC potential into a fundamental parabolic wave signal with a fixed phase and amplitude produced at a fixed repetition frequency, during a specific period of each cycle, inserting a DC potential proportional to a position control quantity of a montage pattern into a sawtooth wave with a fixed amplitude produced at the fixed repetition frequency, during the specific period of each cycle, mixing the parabolic signal with the sawtooth wave, and clamping to a predetermined potential the potential of the sawtooth wave signal before mixed with the parabolic wave signal during the specific period or clamping to a predetermined potential the potential of the mixed signal of the parabola wave signal with the sawtooth wave signal during the specific period.

BRIEF DESCRIPTION OF THE DRAWINGS

FIG. 7 shows another embodiment of the invention;

FIGS. 8A to 8B show waveforms for illustrating the operation of the FIG. 7 system;

FIGS. 9A and 9B show the vertical parabolic wave and vertical sawtooth wave corresponding to those shown in FIGS. 8A and 8B; and FIG. 10 illustrates generation of a control pulse for controlling the size of a circular wipe pattern, the pulse being usable for the system of the invention.

DESCRIPTION OF THE PREFERRED EMBODIMENTS

Figure 1:
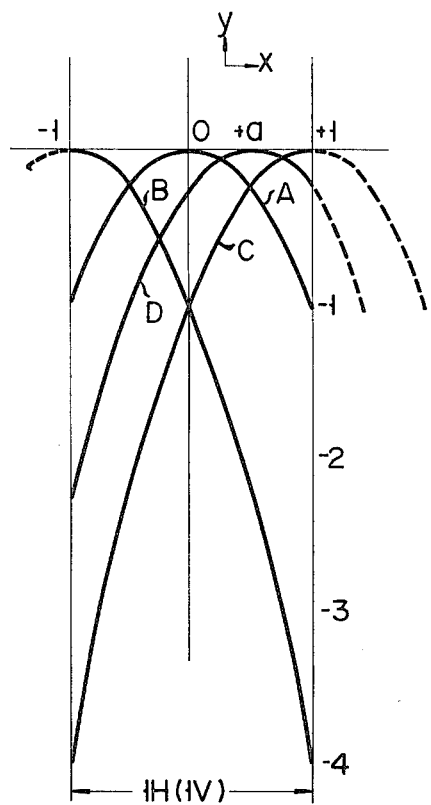
FIG. 1 shows waveforms of desired parabolic waves for movement of the position of a circular wipe pattern.

Referring now to FIG. 1, there is shown a set of waveforms of desired parabolic waves, for various wipe or montage patterns centered at different positions of the screen, of which instantaneous amplitudes continuously change irrespective of their peak positions during one horizontal line-scanning period 1 H (63.5 $\mu$s) and one vertical field-scanning period 1 V (1/60 sec). For ease of explanation, the center of the screen is designated by 0 and the right and left (top and bottom) of the screen are denoted by $-1$ and $+1$, respectively. A parabolic wave for forming a circular wipe pattern centered at the screen center is denoted as A, with the amplitude of 1. Character B is used for denoting a parabolic wave for forming a wipe pattern centered at the starting point of the horizontal or vertical scanning, that is, the left or top end of the screen. The amplitude of the parabolic wave B is four times that of the parabolic wave A. In this wipe pattern, the left half or upper half of it does not appear on the screen. A parabolic wave denoted as C forms a wipe pattern centered at the right end or the bottom of the screen, which parabolic wave has an amplitude four times that of the wave A. In this case, the right or lower half of the circular pattern does not appear on the screen.

A parabolic wave D centered at a point a on the rectangular coodinates is given $$y = -(x-a)^2 \qquad (1)$$

In the equation (1), the y corresponds to the parabolic wave A when $a=0$; the wave B when $a=-1$; the wave C when $a=+1$.

The equation (1) is expanded as follows:

$$y = -x^2 + 2ax - a^2 = yA + 2ax - a^2 \qquad (2)$$

where yA is a symmetrical parabolic wave $A(-x^2)$. As seen from the equation (2), parabolic waves shown in FIG. 1 are each composed of a parabolic wave with a fixed amplitude and a symmetrical wave $(-x^2)$, and a sawtooth wave component (2ax) of which the amplitude and the polarity change in dependence on a position control quantity a which is delivered from a positioner for controlling the center position of a wipe pattern, and a DC component $(-a^2)$. The maximum amplitude of the sawtooth wave is determined in dependence on difference between the values obtained by substituting $x=1$ and $x=-1$ for $2ax-a^2$ when $a=1$, and may be four times that of the symmetrical parabolic wave A.

The phase of the continuous parabolic wave is controllable by mixing the symmetrical parabolic wave component A with the sawtooth wave component of which the amplitude and polarity change depending on the wiper pattern position control quantity. With this method, the peak level of the resultant parabolic wave changes dependent on the DC component in the equation (2). This necessitates peak clamping of the mixed signal. Adversely, the peak clamping distorts the waveform of the resultant parabolic wave.

Elimination of the necessity for the peak clamping is attainable by controlling the amplitude and polarity of the sawtooth wave component $(2x-a)$ obtained by superposing a DC component proportional to the position control quantity a on a sawtooth wave with a fixed amplitude prior to the polarity and amplitude control of sawtooth wave, in accordance with the position control quantity, that is to say, by multiplying $(2x-a)$ by a, and then mixing the controlled sawtooth wave component with the symmetrical parabolic wave component. This approach, however, needs a DC coupled transmission system for which it is difficult to obtain a stable operation.

A first embodiment of the invention will be given with reference to FIG. 2. A keying signal for providing a circular or elliptic wipe pattern is formed by slicing the mixture of the horizontal parabolic component and the vertical parabolic component as is well known. The vertical and horizontal parabolic components may be both formed in a similar manner so that only the horizontal parabolic component will be described hereinafter.

Figure 2:
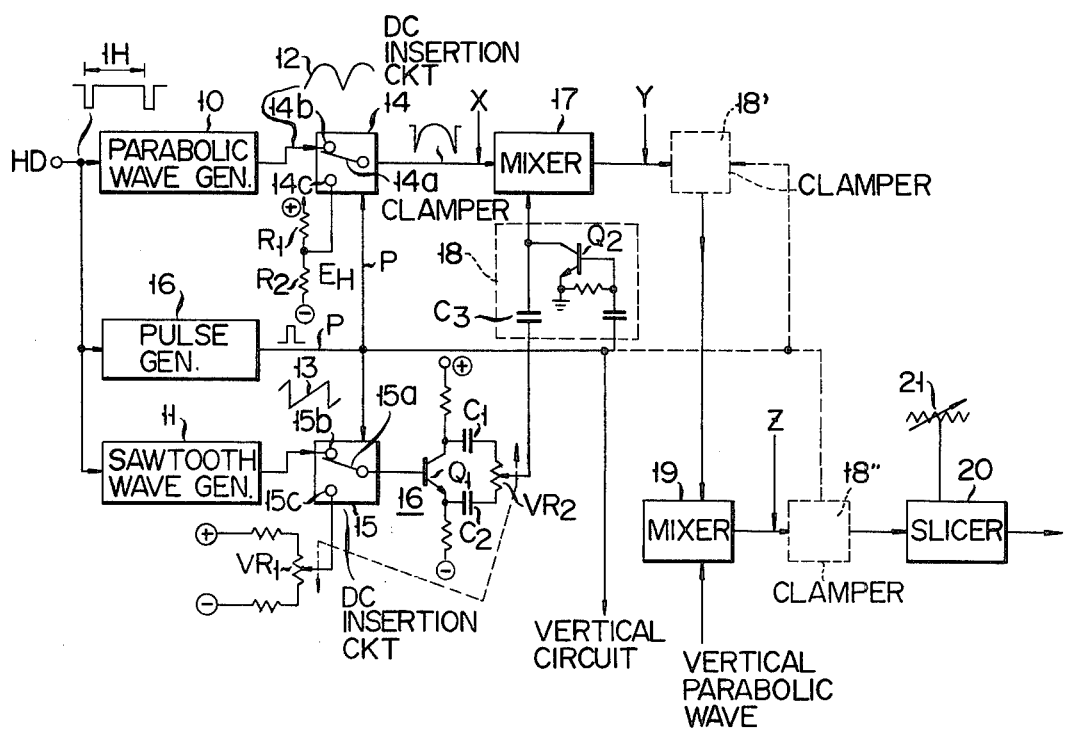
FIG. 2 schematically shows a circuit diagram of a first embodiment of a parabolic wave phase control system according to the present invention.

Referring now to FIG. 2, a horizontal drive pulse HD of 15.75 KHz used in television studios is applied to a parabolic wave generator 10 and to a sawtooth wave generator 11 where a horizontal symmetrical parabolic wave 12 and a horizontal sawtooth wave 13 are produced at a repetition frequency of 15.75 KHz. The amplitude of the horizontal sawtooth wave 13 is four times that of the horizontal parabolic wave. The parabolic signal 12 and the sawtooth wave signal 13 are applied to DC insertion circuits 14 and 15 controlled by an output pulse P of a pulse generator 16, respectively. The control pulse P defines a specific period of one cycle during which DC components are inserted into the parabolic signal and the sawtooth signal. It is desired that the specific period be part of the horizontal flyback or retrace time or its entire time. To this end, in the FIG. 2 embodiment, the positive going pulse P is formed by using the negative going horizontal drive pulse HD. The pulse P is only required to exist within the horizontal flyback period. The width of pulse P may be equal to that of the horizontal drive pulse. In this case, the pulse generator 16 may be replaced by a phase inverter.

The DC inserting circuits 14 and 15 are generally constructed by electronic circuits and, in FIG. 2, they are designated by mechanical single-pole double-throw switches. The circuit 14 is comprised of a movable contact 14a connected to a mixer 17, a normally closed contact 14b connected to the parabolic generator 10, and a normally open contact 14c connected to a voltage divider including resistors $R_1$ and $R_2$. The DC inserting circuit 14, in response to application of the pulse P thereto, serves to fix the potential of the parabolic signal 12 during a specific period of each cycle, i.e., the horizontal flyback period, at the output potential $E_H$ of the voltage dividing circuit. The circuit 15 is comprised of a movable contact 15a, a normally closed contact 15b connected to the sawtooth wave generating circuit 11, a normally open contact 15c connected to a slider of a wipe pattern position control potentiometer $VR_1$ connected between positive and negative power source terminals. Upon receipt of the pulse P, the circuit 15 operates to insert a DC potential proportional to the position control quantity a of a wipe pattern into the sawtooth wave signal 13 during a specific period of each horizontal line-scanning cycle, i.e. the flyback period. The output of the circuit 15 corresponds to the term $(2x-a)$ in the equation (2).

The output of circuit 15 is connected to a sawtooth wave control circuit 16 including a transistor $Q_1$ and a position control potentiometer $VR_2$ of the wipe pattern whose ends are connected to the collector and emitter of transistor $Q_1$, through capacitors $C_1$ and $C_2$, respectively. The position control potentiometers $VR_1$ and $VR_2$ are gauged with each other, as shown. The control circuit 16 is so arranged as to mix sawtooth wave signals with opposite polarities developed at the collector and the emitter of transistor $q_1$ in a ratio in dependance on the position control quantity of the wipe pattern and to thereby control the amplitude and the polarity of output sawtooth wave signal to be combined with the parabolic wave 12 in accordance with the position control quantity of the wipe pattern. The output signal of the control circuit 16 corresponds to the term $a(2x-a)$ of the equation (2).

The output signal of the sawtooth wave control circuit 16 is applied through a pulse clamper 18 to a mixer 17 where it is mixed with a parabolic wave component. The pulse clamper 18 is provided with a capacitor $C_3$ connected between the position controller $VR_2$ and the mixer 17 and a transistor $Q_2$ which connects the output of the capacitor $C_3$ to ground during each horizontal flyback period, in response to the pulse P applied thereto. Through the clamper 18, the level of the sawtooth wave signal varies depending on the position control information $a^2$ inserted into the horizontal flyback period. That is to say, the DC component $a^2$ in the equation (2) is reproduced. The peak level of the output parabolic wave of the mixer 17 is kept always at a fixed level irrespective of the peak position.

The phase-controlled horizontal parabolic wave component is mixed with the vertical parabolic wave component in a mixer 19 and then is led to a slicer 20 where a keying signal is formed. The slicer 20 is coupled with a fader controller 21 for controlling the size of a wipe pattern.

Figure 3A:
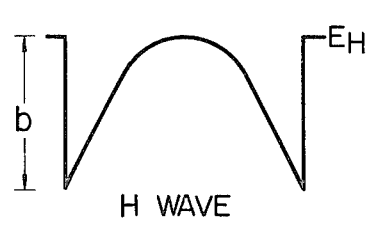
FIGS. 3A to 3D show waveforms for explaining the operation of the system of FIG. 2.
Figure 3B:
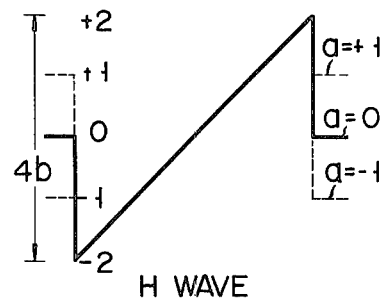
Figure 3C:
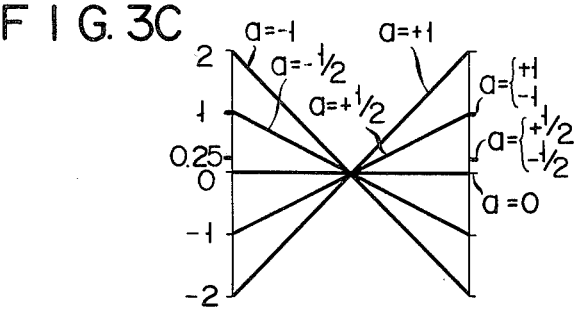
Figure 3D:
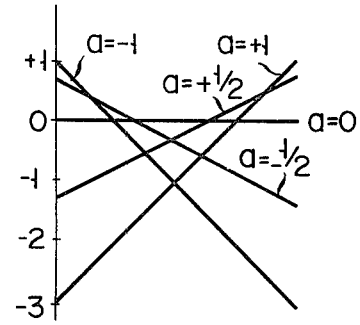

The operation of the embodiment in FIG. 2 will be seen from the following description taken in connection with the waveforms shown in FIGS. 3A to 3D. FIG. 3A shows the waveform of an output signal of the DC inserting circuit 14 for the symmetrical parabolic wave. In this embodiment, the DC level to be inserted into the parabolic wave within the flyback period is selected to be the peak level of the parabolic wave 12. FIG. 3B shows an output waveform of the DC inserting circuit 15 for the sawtooth wave 13. The sawtooth wave component is not changed by the position control information but the DC level within the flyback period changes in proportion to the position control information a. When the slider of the position controller $VR_1$ in FIG. 2 is positioned at the top in the figure, the position control information a is 1, while it is positioned at the bottom, the a is $-1$. As shown, when the slider is positioned at the center, the a is 0. FIG. 3C shows the waveforms of the output signals of the position controller $VR_2$. As shown, the amplitude and the polarity of the sawtooth wave change depending on the position control information a and the DC level in the flyback period also changes in accordance with the position control information $a^2$. The DC level within the flyback period is invariable either for 1 or $-1$ of the position control quantity a. When the slider of the $VR_2$ in FIG. 2 is positioned at the top, the position control information a is $-1$, while it is positioned at the bottom, the a is $+1$. FIG. 3D shows output waveforms of the pulse clamper 18. Since the DC level within the flyback period is clamped to the zero potential, the sawtooth wave portion changes as shown in the figure. The output of the pulse clamp circuit 18 completely corresponds to the $a(2x-a)$ in the equation (2).

Figure 4A:
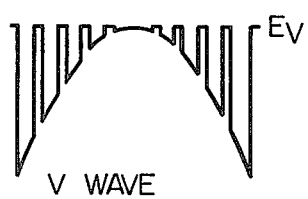
FIGS. 4A and 4B show waveforms of a vertical parabolic wave and a vertical sawtooth wave.
Figure 4B:
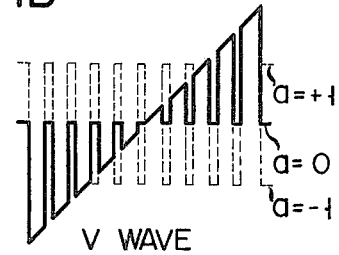

The vertical wave component may be formed by using a vertical drive pulse of 60 Hz in a manner similar to that of the horizontal wave component. In this case, the abovementioned P may be used to control DC inserting circuits for vertical parabolic and sawtooth waves. The vertical parabolic wave is shown in FIG. 4A and the vertical sawtooth waveform is illustrated in FIG. 4B. The cut portions of the respective vertical waves correspond to the specific periods, i.e. the horizontal flyback periods. In FIGS. 4A and 4B, the time ratio of the vertical to the horizontal is exaggerated.

In FIG. 2, the pulse clamping circuit 18 is provided at the input side of mixer 17; however, the clamping operation may be performed after mixing of the parabolic wave with the sawtooth wave, as denoted at 18′. Otherwise, it may be effected after mixing of the horizontal component with the vertical component, as denoted at 18″. Both clamping operations provide the same result as that obtained when the clamping operation is made before mixing of the parabolic wave with the sawtooth wave. It is to be noted that it is more preferable to effect a clamping operation after mixing of the horizontal component with the vertical component, since there is no need of DC stability in the transmission system from the DC inserting circuit to the slicer 20.

Figure 5:
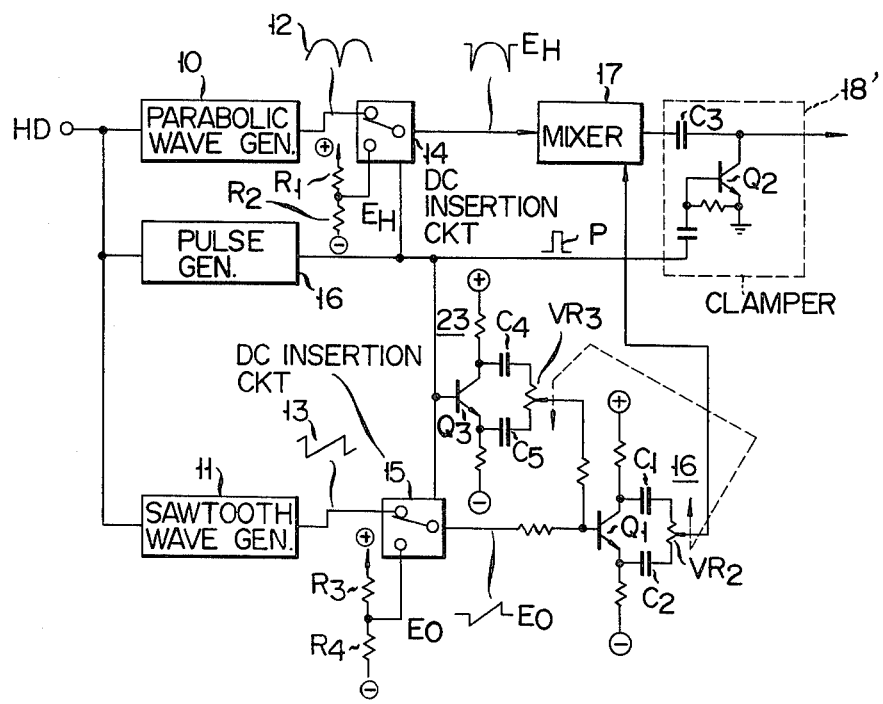
FIG. 5 shows a modification of the circuit of FIG. 2.
Figure 6A:
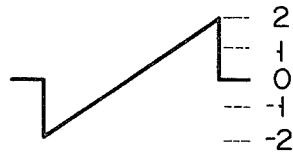
FIGS. 6A and 6B are waveforms for illustrating the operation of the system of FIG. 5.
Figure 6B:

Reference is made to FIG. 5 illustrating a modification of the embodiment in FIG. 2. In this embodiment, the DC inserting circuit 15 for the sawtooth wave is so arranged as to insert the center level $E_0$ of the sawtooth wave into the sawtooth wave during the specific period of the sawtooth wave signal, thereby to form a waveform as shown in FIG. 6A. The center level $E_0$ is provided by dividing resistors $R_3$ and $R_4$. A clamping pulse amplitude control circuit 23 is provided which is comprised of a transistor $Q_3$, capacitors $C_4$ and $C_5$, and a position controller $VR_3$ gauged with another position controller $VR_2$. The pulse control circuit 23 controls the amplitude and the polarity of the clamping pulse P applied to the base of the transistor $Q_3$ in accordance with the position control quantity, thereby to form an output signal as shown in FIG. 6B. The output of the pulse control circuit 23 is mixed with the output of the DC inserting circuit 15 and the mixture is then applied to the amplitude and polarity control circuit 16. As is easily understood, the mixed output takes a waveform as shown in FIG. 3B. In this embodiment, the clamp circuit 18′ is provided at the output side of the mixer 17 for mixing the parabolic wave with the sawtooth wave.

Turning now to FIG. 7, there is shown a third embodiment of the present invention. The equation (1) may be expressed below.

$$y = -(x+1)^2 + 2(a+1)x - (a^2-1) \tag{3}$$

In the above equation, $-(x+1)^2$ indicates the parabolic wave B in FIG. 1; $a(a+1)x$ a sawtooth wave only amplitude of which is controlled by the position control information a $(-1 \leq a \leq 1)$; $-(a^2-1)$ a DC component. As described above, the FIG. 7 embodiment is such that the phase of the output parabolic wave is controlled by mixing the parabolic wave B with the sawtooth wave which is substantially opposite in phase to the parabolic wave B, that is, of which the amplitude changing direction with time is opposite to that of the parabolic wave B. In this embodiment, the maximum amplitude of the sawtooth wave may be twice the amplitude of the parabolic wave B.

In FIG. 7, reference numeral 31 designates a parabolic wave signal generator to produce the parabolic wave B with a fixed amplitude b and of which the peak is positioned at the beginning of one cycle period. Reference numeral 32 designates a generator for forming a sawtooth wave with the amplitude 2b. As shown in FIG. 8A, the DC inserting circuit 14 is responsive to the clamping pulse P to insert a fixed DC level $E_H$ into the parabolic wave during the specific period. Similarly, a fixed DC level is inserted into the sawtooth wave during the specific period of one cycle thereof by the DC insertion circuit 15. The clamp pulse P is controlled in its amplitude by a position control potentiometer $VR_4$ in proportion to the position control quantity a. The amplitude-controlled pulse is superposed onto a sawtooth wave signal delivered from the DC inserting circuit 15. As a result, the DC level of sawtooth wave within the specific period of each cycle, i.e. the horizontal flyback period varies in proportion to the position control quantity a as shown in FIG. 8B. The sawtooth wave signal of which the DC level during the specific period changes in proportion to the position control quantity a is applied to an amplitude control circuit comprised of a transistor $Q_4$ and a position control potentiometer $VR_5$ connected to the emitter of transistor $Q_4$ so that the amplitude of the sawtooth wave signal is controlled in proportion to the position control quantity a. The amplitude-controlled sawtooth wave signal is mixed with the parabolic signal by the mixer 17. When the level of the mixed output signal during the specific period is clamped to zero potential by means of the clamp circuit 18', produced is such a parabolic wave that its peak position changes in dependance on the function of the position control quantity a but its peak level does not change. FIGS. 9A and 9B illustrate a vertical parabolic wave and a vertical sawtooth wave, respectively, which waves are formed in a manner similar to that of the FIG. 7 system.

Although the size control of a circular wipe pattern, i.e. the fader control, is not essentially related to the present invention, the fader control may be performed by adjusting the slice level in the slicer circuit 20 through the fader controller 21 in a conventional manner. This may also be effected by adjusting the clamp level in the clamper 18" connected to the output of the mixer 19 for mixing horizontal and vertical parabolic waves, through the fader controller. In this case, the slice level of the slicer 20 may be fixed. When the clamper circuit is provided at the output side of the mixer 17, as indicated by 18' in FIG. 2, the negative going clamping pulse amplitude-controlled by the fader controller $VR_6$ shown in FIG. 10 may be applied to the input of the mixer 17 or the clamp circuit 18'. When the clamp circuit is placed at the output side of the mixer 19, as indicated by 18", the amplitude-controlled negative going pulse may be applied to the input of the clamp circuit 18".

What we claime is:

1. A method for controlling the phase of a continuous parabolic wave used to form a circular or elliptic montage pattern on the screen of a television cathode ray tube in order to move the position of the montage pattern, comprising the steps of:
    producing at a fixed repetition frequency a parabolic wave signal with a fixed amplitude and phase;
    inserting a given DC potential into said parabolic wave signal during a specific period of each cycle;
    producing a sawtooth wave signal at said fixed repetition frequency;
    inserting a DC potential proportional to a position control quantity of the montage pattern into said sawtooth wave signal during said specific period of each cycle;
    controlling in proportion to the position control quantity the amplitude of a sawtooth wave signal having the DC potential proportional to the position control quantity during said specific period of each cycle; and
    mixing the controlled sawtooth wave signal with said parabolic wave signal.

2. A method according to claim 1, further comprising the step of clamping to a fixed predetermined potential a signal potential of the amplitude-controlled sawtooth have signal during said specific period of each cycle.

3. A method according to claim 1, further comprising the step of clamping to a fixed predetermined potential a signal potential of the mixed signal formed by mixing the controlled sawtooth wave signal with said parabolic signal during said specified period of each cycle.

4. A method according to claim 1, in which said specific period is at least part of the flyback period of a horizontal-line scanning period.

5. A method according to claim 1, in which said fixed repetition frequency is a horizontal scanning frequency.

6. A method according to claim 1, in which said fixed repetition frequency is a vertical scanning frequency.

7. A system for controlling the phase of a continuous parabolic wave used to form a circular or elliptic montage pattern on the screen of a television cathode ray tube in order to move the position of the montage pattern, comprising:
    means for producing at a fixed repetition frequency a parabolic wave signal with a fixed amplitude and phase;
    means for fixing at a predetermined potential a potential of said parabolic wave signal during a specific period of each cycle;
    means for producing a sawtooth wave signal at said fixed repetition frequency;
    means for converting a potential of said sawtooth wave signal during said specific period of each cycle to a DC potential proportional to a position control quantity of the montage pattern;
    means for controlling in proportion to the position control quantity the amplitude of a sawtooth wave signal having the DC potential proportional to the position control quantity during said specific period of each cycle; and
    means for mixing said sawtooth wave signal controlled with the parabolic wave signal of which a potential during said specific period of each cycle is fixed at said predetermined potential.

8. A system according to claim 7, further comprising means for clamping to a predetermined potential a signal potential of said amplitude-controlled sawtooth wave signal during said specific period of each cycle.

9. A system according to claim 7, further comprising means for clamping to a predetermined potential a signal potential of an output signal of said mixing means during said specific period of each cycle.

10. A system according to claim 7, in which said specific period is at least part of the flyback period of a horizontal-scanning period.

11. A system for controlling the phase of a continuous parabolic wave used to form a circular or elliptic montage pattern on the screen of a television cathode ray tube in order to move the location of the montage pattern, comprising:
    means for producing at a fixed repetition frequency a parabolic wave signal with a fixed amplitude and a symmetrical waveform;
    means for inserting a predetermined DC potential into said parabolic wave signal during a specific period of each cycle of said parabolic wave signal;
    means for producing at said fixed repetition frequency a sawtooth wave signal with a fixed amplitude;
    means for inserting a DC potential proportional to a position control quantity of the montage pattern into said sawtooth wave signal during said specific period of each cycle of said sawtooth wave signal;
    means for controlling the amplitude and the polarity of the sawtooth wave signal with the inserted DC potential proportional to the position control quantity, the amplitude of the controlled sawtooth wave signal being in proportion to the position control quantity; and means for mixing the controlled sawtooth wave signal with the parabolic wave signal having the predetermined DC potential inserted during said specific period of each cycle.

12. A system according to claim 11, further comprises means for clamping to a predetermined potential a potential during said specific period of said controlled sawtooth wave signal.

13. A system according to claim 11, further comprising means for clamping to a predetermined potential a signal potential during said specific period of an output signal of said mixing means.

14. A system according to claim 11, in which said specific period is at least part of the flyback period of a horizontal scanning cycle.

15. A system according to claim 11, in which said means for inserting the DC potential proportional to the position control quantity of the montage pattern into said sawtooth wave signal during the specific period of each cycle of said sawtooth wave signal includes means for inserting a predetermined DC potential into the sawtooth wave signal during the specific period of each cycle of said sawtooth wave signal produced at said fixed repetition frequency, and means for superposing a potential proportional to the position control quantity during said specific period to said sawtooth wave signal in which said predetermined DC potential is inserted during the specific period of each cycle.

16. A system according to claim 11, in which said fixed repetition frequency is a horizontal scanning frequency.

17. A system according to claim 11, in which said fixed repetition frequency is a vertical scanning frequency.

18. A system according to claim 11, in which the amplitude of the sawtooth wave signal to be amplitude-controlled is substantially four times that of the parabolic wave.

19. A system for controlling the phase of a continuous parabolic wave used to form a circular or elliptic montage pattern on the screen of a television cathode ray tube in order to move the location of the montage pattern, comprising:

means for producing at a fixed repetition frequency a parabolic wave signal which has a fixed amplitude and of which the peak is positioned at one end of one cycle period;

means for inserting a predetermined DC potential into said parabolic wave signal during a specific period of each cycle of said parabolic wave;

means for producing at said fixed repetition frequency a sawtooth wave signal which has a fixed amplitude and is in substantially opposite phase relation to said parabolic wave signal;

means for inserting a DC potential proportional to a position control quantity of the montage pattern into said sawtooth wave signal during said specified period of each cycle of said sawtooth wave signal;

control means for rendering proportional to the position control quantity the amplitude of the sawtooth wave signal having the DC potential proportional to said position control quantity inserted; and means for mixing said amplitude-controlled sawtooth wave signal with the parabolic wave signal having the predetermined DC potential inserted during the specific period of each cycle.

20. A system according to claim 19, further comprising means for clamping to a predetermined potential the DC potential of an output signal of said mixing means during the specific period of each cycle.

21. A system according to claim 19, in which said means for inserting the DC potential proportional to the position control quantity during the specific period of each cycle of said sawtooth wave signal includes means for inserting a predetermined DC potential during the specific period of each cycle into the sawtooth wave signal produced at said fixed repetition frequency, and means for superposing the DC potential proportional to the position control quantity during the specific period of each cycle to the sawtooth wave signal having the predetermined DC potential inserted.

22. A system according to claim 19, in which the amplitude of the sawtooth wave signal before its amplitude is controlled is substantially twice that of the parabolic wave signal.

23. A system according to claim 19, in which said specific period is at least part of the flyback period of a horizontal scanning cycle.

24. A system according to claim 19, in which said fixed repetition frequency is a horizontal scanning frequency.

25. A system according to claim 19, in which said fixed repetition frequency is a vertical scanning frequency.

26. A method according to claim 1 wherein said step of controlling includes controlling both the amplitude and polarity of a sawtooth wave signal.

27. A system according to claim 7 wherein said means for controlling includes means for controlling both the amplitude and polarity of a sawtooth wave signal.

* * * * *